No. 619,141. Patented Feb. 7, 1899.
J. CRAIG.
WHEEL RIM.
(Application filed Mar. 3, 1898.)
(No Model.) 3 Sheets—Sheet 1.
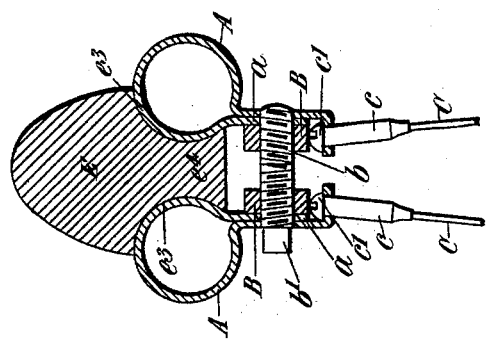
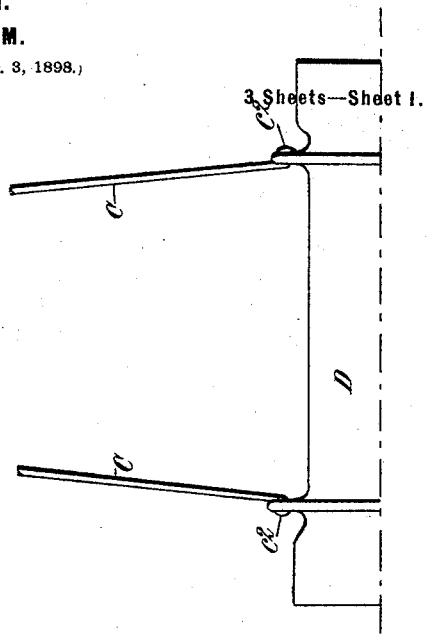
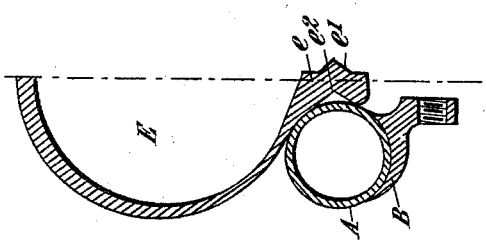
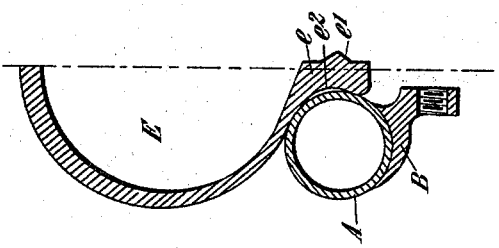
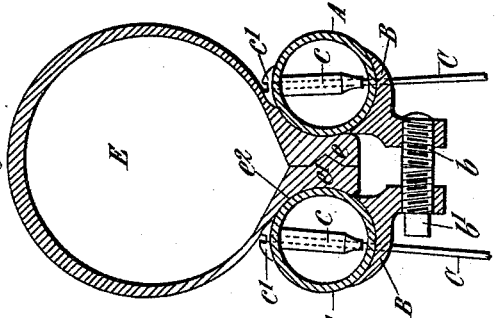
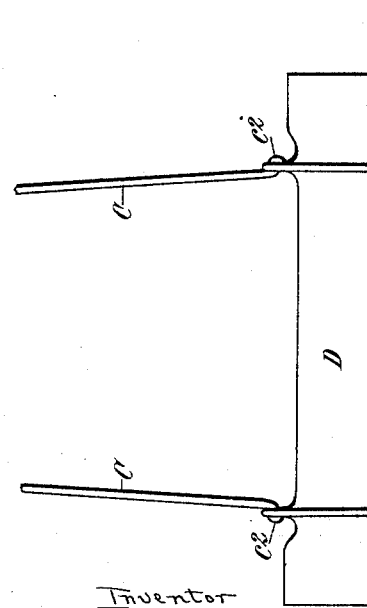
Witnesses
Inventor
John Craig
By James L. Norris.
Atty
THE NORRIS PETERS CO., PHOTO-LITHO., WASHINGTON, D. C.

No. 619,141. Patented Feb. 7, 1899.
J. CRAIG.
WHEEL RIM.
(Application filed Mar. 3, 1898.)
(No Model.) 3 Sheets—Sheet 2.

Witnesses
Inventor
John Craig
By James L. Norris
Atty

No. 619,141. Patented Feb. 7, 1899.
J. CRAIG.
WHEEL RIM.
(Application filed Mar. 3, 1898.)

(No Model.) 3 Sheets—Sheet 3.

THE NORRIS PETERS CO., PHOTO-LITHO., WASHINGTON, D. C.

UNITED STATES PATENT OFFICE.

JOHN CRAIG, OF LONDON, ENGLAND.

WHEEL-RIM.

SPECIFICATION forming part of Letters Patent No. 619,141, dated February 7, 1899.

Application filed March 3, 1898. Serial No. 672,386. (No model.)

*To all whom it may concern:*

Be it known that I, JOHN CRAIG, india-rubber manufacturer, a subject of the Queen of Great Britain, residing at 8 Wood street, Cheapside, London, England, have invented certain new and useful Improvements in and Relating to Wheel Rims and Tires, of which the following is a specification.

This invention relates to improvements connected with wheel-rims and inflatable, resilient, or other tires; and it mainly consists in so constructing the wheel-rim that the tire may be gripped between circumferentially-separable portions thereof, whereby it is securely held in position and in the case of certain inflatable tires is also rendered air-tight.

According to my invention I construct the wheel-rim of two separate circumferential portions or sections which may be composed of metal, wood, or other suitable material and which are connected to the wheel-hub by spokes. Each of these circumferential sections of the rim is provided with a number of radial lugs or projections which are so arranged that the lugs upon one circumferential section face the lugs upon the other in pairs, each pair of lugs being connected by a right and left handed screw-threaded pin provided with suitable means whereby the latter can be revolved in either direction to cause the two circumferential sections of the wheel-rim to simultaneously approach toward or recede from each other. This simultaneous movement of the two portions of the rim is an important feature of my invention. In this way a tire suitably constructed for the purpose, as hereinafter described, may be gripped more or less tightly as desired between the said circumferential sections, and by this means held securely in position upon the said rim.

In order that my said invention may be clearly understood and readily carried into effect, I will proceed to describe the same more fully with reference to the accompanying drawings, in which—

Figure 2:
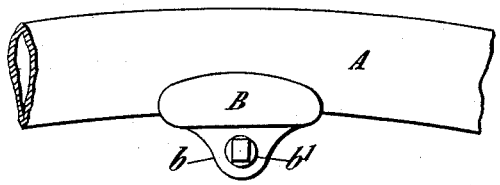
Figure 4:
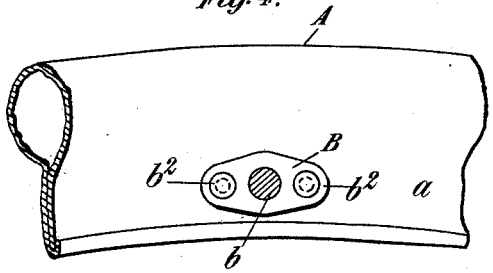
Figure 5:
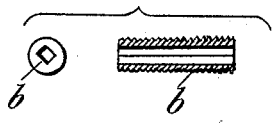
Figure 6:
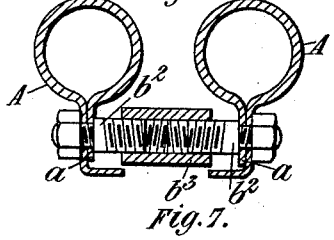
Figure 7:
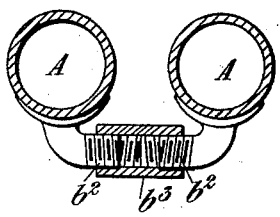
Figure 12:
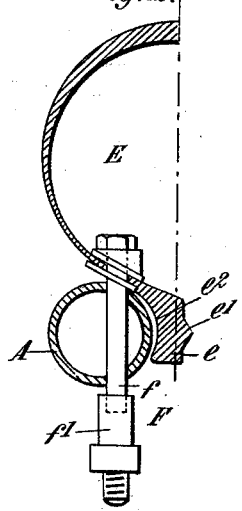
Figure 13:
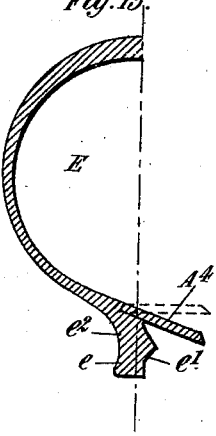

Figure 1 is a transverse section of a wheel rim and tire constructed in accordance with my invention. In this view the hub of the wheel and the spokes are likewise shown. Figs. 1ª and 1ᵇ are detail views showing the thickened edges of the tire formed with recessed outer faces, as hereinafter described. Fig. 2 is a fragmentary view showing one of the lugs with which the wheel-rim is provided. Fig. 3 is a transverse section of a modified construction of the wheel rim and tire. Fig. 4 is a fragmentary view showing one of the lug-plates and screw-pins with which this wheel-rim is provided. Fig. 5 shows a longitudinal section and an end view of a modified construction of one of the screw-threaded pins. Figs. 6 and 7 are transverse sections of modified forms of the device for adjusting the movable portions of the wheel-rim. Figs. 8, 9, 10, and 11 are transverse sections of further modified forms of my wheel rim and tire. Fig. 12 is a detail view illustrating an inflation-valve and its application to the wheel-rim. Fig. 13 is another detail view showing one of the edges of a tire provided with a curtain or flap.

In all the figures like letters of reference indicate similar parts.

A A are the two circumferential portions or sections of the wheel-rim.

B B are the radial lugs, projections, or plates thereon.

C C are the spokes.

D is the hub.

E is the tire, and F the inflation-valve.

Referring more particularly to Figs. 1 and 2, the circumferential portions A of the wheel-rim are of hollow circular section and composed of metal with the lugs B brazed thereto. These lugs are, as hereinbefore stated, arranged opposite one another in pairs, those on one circumferential portion of the wheel-rim being formed with right-hand screw-threaded holes and those on the other with left-hand screw-threaded holes. They are coupled together by the right and left handed screw-pins *b*, having on one end a rectangular head *b'* for enabling a spanner or key to be fitted thereon when said pins are to be revolved. By means of these right and left handed screw-pins I provide for the aforesaid simultaneous movement of both sections of the wheel-rim toward or away from each other in accordance with the direction in which the pins are revolved. Moreover, the sections of the wheel-rim are at all times held rigidly together by the said pins, so that when the spokes are connected with the said sections and the hub the wheel can be built up and made true independently of the tire itself.

The connection of the spokes to the wheel is effected by means of screw-nipples $c\ c$, having notched heads $c'$ to permit of their being revolved by a turn-screw in order to adjust the tension of the spokes. The heads of these nipples are represented as lying on the outer periphery of the wheel-rim. They may, however, occupy other positions, if desired. The inner ends of the spokes are connected to the flanges of the wheel-hub by bent and rivet-headed ends $c^2$, as is well understood. I may, however, employ a spoke having a solid head at its rim end and at its other end adapted to be screwed into the flange of the hub.

The tire is of the "tubeless" type with thickened edges $e\ e$, which are adapted to come together and be gripped between the two sections of the wheel-rim. I prefer to form one of the said edges with a beading or abutment $e'$ to engage with a corresponding groove in the opposite edge, so that the air-tight connection between the two edges may be the more effectual. It will be found advantageous to form the outer portions of the abutting edges of the tire with curved faces $e^2\ e^2$, whose curvature is of somewhat smaller radius than that of the circular section of the circumferential portions of the rim A. By such means when the pins $b$ are screwed up a more effectual seating of the abutting faces of the tire edges will be obtained than would be the case if the curvature of the faces $e^2$ were greater than or the same as that of the rim A A.

Instead of forming the outer portions of the abutting edges of the tire with curved faces $e^2$ I may form them with V-shaped depressions or recesses in their faces, as in Fig. 1$^b$, for the same purpose.

The aforesaid lugs B are sometimes constructed of separate pieces or plates, as in Fig. 4, connected to the wheel-rim by rivets or screws $b^2$. In this case each section A of the rim has an inwardly-projecting radial web $a$, (see Fig. 3,) to the inner face of which the lug-plates B are connected. In cases where the circumferential rings A are made of cast metal the lugs B may be cast on the rings. The pins $b$ may be made in the form shown at Fig. 5—that is to say, they may have a square or other rectangular interior, so that a rectangular pin or key can be inserted to turn them. The rectangular end $b'$, before mentioned, can then be dispensed with, or I may construct the adjusting device as illustrated in Figs. 6 and 7—that is to say, I may use two short oppositely-threaded screw-pins $b^2\ b^2$, connected together by a screw-sleeve $b^3$, internally threaded to correspond with the pins $b^2$ and externally formed of square or other suitable shape to permit of its being readily revolved by a spanner or similar tool.

In Fig. 3 I have shown a solid tire formed with curved portions $e^3\ e^3$ to receive the circumferential sections A A of the wheel-rim and with a central portion $e^4$, which is gripped between the said sections A.

Figure 8:
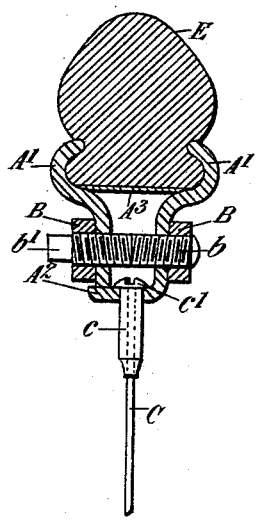

In Fig. 8 the circumferential portions of the rim are of solid cross-section instead of tubular, as in Figs. 1 and 3. The outer edges A' A' of both of these portions are grooved or bent into a hook form, and the inner edge A$^2$ of one of such circumferential portions is bent at right angles to form a flange for the reception of the spoke-nipples, there being in this instance only one series of spokes instead of two series, as in the previously-described examples. The lugs B are in this example affixed to or cast upon the outer faces of the circumferential portions of the wheel-rim. Where the thickness of the web of the circumferential portions of the rim is sufficient, the lug-plates may be dispensed with and the right and left handed screw-threads may be formed in the web itself. The tire is shaped to fit the said hook-pieces A', and I prefer to employ in this construction an extensible band A$^3$ for the tire to lie upon.

Figure 9:
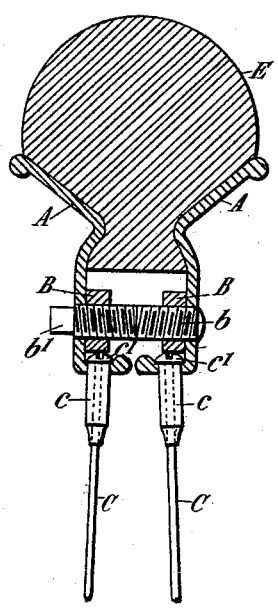
Figure 10:
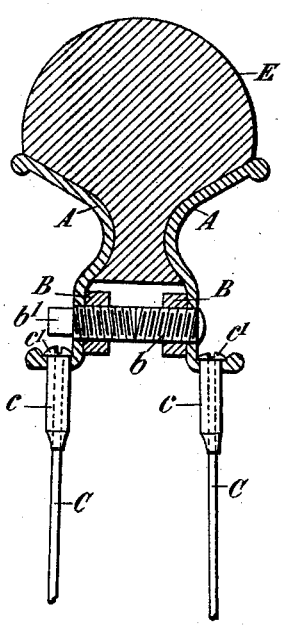

In Figs. 9 and 10 I have shown other examples of the shape that the circumferential portions of the wheel-rim may assume in cross-section. In each case the tire, if of the solid form, is molded to suit the shape of the rim.

When employing tubeless tires of the kind indicated in Fig. 1, I sometimes provide one of the edges with an internal overlapping portion A$^4$, (see Fig. 13,) which is arranged to have a tendency to bend inward or downward, so that when the thickened edges abut the overlapping portion A$^4$ will not only lie over but also press upon the joint, and thereby more effectually render the said joint air-tight.

The inflation-valve F is preferably constructed in two parts $f\ f'$, one of less diameter than the other. The portion $f$ of less diameter is composed of a tube connected to the tire in any well-known manner and passed transversely through the circumferential portion of the rim. The outer end of said portion $f$ is connected to the portion $f'$, which is of larger diameter and contains the valve proper of any suitable description. The object of making the said valve in the above manner is chiefly to avoid forming a hole of large diameter through the rim, so that it will not be unnecessarily weakened. Obviously I may use any other valve of suitable construction and arrange it in any desired position.

Figure 11:
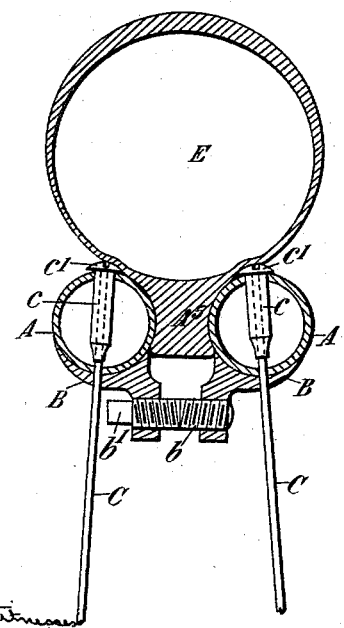

In Fig. 11 I have illustrated a tire of the "hose-pipe" type, which is provided with a radial fin or flange A$^5$ to fit between and be held by the said portions A of the wheel-rim.

I wish it to be understood that I do not confine myself to the shape in cross-section of the wheel rims and tires above described, as the shape can manifestly be varied considerably without departing from my invention. Moreover, my wheel-rim may be used with tires differing in construction from those shown in the drawings. For instance, I may use tires in which an air-tube is employed.

Having now particularly described and ascertained the nature of my said invention and in what manner the same is to be performed, I would state that I am aware that it has before been proposed to construct a wheel-rim of two portions which are adapted to grip between them the tire or a projection thereon, and I therefore do not intend to claim, broadly, a wheel rim and tire of this description; but What I do claim is—

The combination of a wheel-rim composed of two separate circumferential portions arranged side by side, each section provided with a number of radial lugs or projections extending inwardly toward the center of the wheel and so arranged that the lugs upon one circumferential section face the lugs upon the other in pairs, said lugs or projections provided with right and left threaded parts, right and left threaded rotatable connections in screw-threaded engagement with the right and left threaded parts of the radial lugs or projections, and spokes connected to the hub and to the two circumferential portions composing the rim, substantially as described.

In testimony whereof I have hereunto set my hand, in presence of two subscribing witnesses, this 22d day of February, 1898.

JOHN CRAIG.

Witnesses:
 H. ASHBY NORRIS,
 A. B. CROFTS.